(12) United States Patent
Petrzilek et al.

(10) Patent No.: US 8,780,531 B2
(45) Date of Patent: *Jul. 15, 2014

(54) MECHANICALLY ROBUST SOLID ELECTROLYTIC CAPACITOR ASSEMBLY

(75) Inventors: Jan Petrzilek, Usti nad Orlici (CZ); Miloslav Uher, Lanskroun (CZ); Lotfi Djebara, Paris (FR)

(73) Assignee: AVX Corporation, Fountain Inn, SC (US)

( * ) Notice: Subject to any disclaimer, the term of this patent is extended or adjusted under 35 U.S.C. 154(b) by 20 days.

This patent is subject to a terminal disclaimer.

(21) Appl. No.: 13/599,132

(22) Filed: Aug. 30, 2012

(65) Prior Publication Data

US 2012/0327561 A1 Dec. 27, 2012

Related U.S. Application Data

(63) Continuation of application No. 12/849,187, filed on Aug. 3, 2010, now Pat. No. 8,259,436.

(51) Int. Cl.
*H01G 9/28* (2006.01)
(52) U.S. Cl.
USPC ........... 361/525; 361/523; 361/528; 361/529; 361/530; 361/519
(58) Field of Classification Search
USPC .................. 361/525, 517–519, 523, 528–529, 361/530–531, 540–541
See application file for complete search history.

(56) References Cited

U.S. PATENT DOCUMENTS

| | | | |
|---|---|---|---|
| 3,345,545 A | 10/1967 | Bourgault et al. | |
| 4,085,435 A | 4/1978 | Galvagni | |
| 4,203,194 A | 5/1980 | McGrath | |
| 4,931,901 A | 6/1990 | Heron, Jr. | |
| 4,945,452 A | 7/1990 | Sturmer et al. | |
| 5,198,968 A | 3/1993 | Galvagni | |
| 5,300,575 A | 4/1994 | Jonas et al. | |
| 5,357,399 A | 10/1994 | Salisbury | |

(Continued)

FOREIGN PATENT DOCUMENTS

| | | |
|---|---|---|
| EP | 1391474 A1 | 2/2004 |
| GB | 2437613 | 10/2007 |

(Continued)

OTHER PUBLICATIONS

Abstract of Japanese Patent No. JP2001284192, Oct. 12, 2001.

(Continued)

*Primary Examiner* — Nguyen T Ha
(74) *Attorney, Agent, or Firm* — Dority & Manning, P.A.

(57) ABSTRACT

An integrated capacitor assembly that contains at least two solid electrolytic capacitor elements electrically connected to common anode and cathode terminations is provided. The capacitor elements contain an anode, a dielectric coating overlying the anode that is formed by anodic oxidation, and a conductive polymer solid electrolyte overlying the dielectric layer. The capacitor elements are spaced apart from each other a certain distance such that a resinous material can fill the space between the elements. In this manner, the present inventors believe that the resinous material can limit the expansion of the conductive polymer layer to such an extent that it does not substantially delaminate from the capacitor element. In addition to possessing mechanical stability, the capacitor assembly also possesses a combination of good electrical properties, such as low ESR, high capacitance, and a high dielectric breakdown voltage.

25 Claims, 1 Drawing Sheet

(56) References Cited

U.S. PATENT DOCUMENTS

| | | |
|---|---|---|
| 5,377,073 A | 12/1994 | Fukaumi et al. |
| 5,394,295 A | 2/1995 | Galvagni et al. |
| 5,457,862 A | 10/1995 | Sakata et al. |
| 5,461,537 A | 10/1995 | Kobayashi et al. |
| 5,473,503 A | 12/1995 | Sakata et al. |
| 5,478,965 A | 12/1995 | Hashiba |
| 5,495,386 A | 2/1996 | Kulkarni |
| 5,638,253 A | 6/1997 | Hasegawa |
| 5,729,428 A | 3/1998 | Sakata et al. |
| 5,812,367 A | 9/1998 | Kudoh et al. |
| 5,949,639 A | 9/1999 | Maeda et al. |
| 6,191,936 B1 | 2/2001 | Webber et al. |
| 6,197,252 B1 | 3/2001 | Bishop et al. |
| 6,238,444 B1 | 5/2001 | Cadwallader |
| 6,243,605 B1 | 6/2001 | Youker et al. |
| 6,322,912 B1 | 11/2001 | Fife |
| 6,343,004 B1 | 1/2002 | Kuranuki et al. |
| 6,391,275 B1 | 5/2002 | Fife |
| 6,392,869 B2 | 5/2002 | Shiraishi et al. |
| 6,400,556 B1 | 6/2002 | Masuda et al. |
| 6,416,730 B1 | 7/2002 | Fife |
| 6,527,937 B2 | 3/2003 | Fife |
| 6,535,375 B1 | 3/2003 | Jung et al. |
| 6,560,090 B2 | 5/2003 | Uenishi et al. |
| 6,563,693 B2 | 5/2003 | Nakada et al. |
| 6,576,099 B2 | 6/2003 | Kimmel et al. |
| 6,592,740 B2 | 7/2003 | Fife |
| 6,635,729 B1 | 10/2003 | Groenendaal et al. |
| 6,639,787 B2 | 10/2003 | Kimmel et al. |
| 6,674,635 B1 | 1/2004 | Fife et al. |
| 6,689,187 B2 | 2/2004 | Oda |
| 6,751,833 B2 | 6/2004 | Saito et al. |
| 6,757,152 B2 | 6/2004 | Galvagni et al. |
| 6,816,358 B2 | 11/2004 | Kida et al. |
| 6,819,546 B2 | 11/2004 | Kuriyama |
| 6,852,830 B2 | 2/2005 | Groenendaal et al. |
| 6,912,117 B2 | 6/2005 | Arai et al. |
| 6,970,344 B2 | 11/2005 | Arai et al. |
| 6,985,353 B2 | 1/2006 | Hirota et al. |
| 6,987,663 B2 | 1/2006 | Merker et al. |
| 7,116,548 B2 | 10/2006 | Satterfield, Jr. |
| 7,118,690 B2 | 10/2006 | Wessling et al. |
| 7,138,713 B2 | 11/2006 | Kida et al. |
| 7,154,740 B2 | 12/2006 | Merker et al. |
| 7,161,797 B2 | 1/2007 | Vaisman et al. |
| 7,190,571 B2 | 3/2007 | Heusmann et al. |
| 7,218,505 B2 | 5/2007 | Naito et al. |
| 7,220,397 B2 | 5/2007 | Kimmel et al. |
| 7,221,555 B2 | 5/2007 | Goldberger |
| 7,262,511 B2 | 8/2007 | Osako et al. |
| 7,279,015 B2 | 10/2007 | Merker |
| 7,341,705 B2 | 3/2008 | Schnitter |
| 7,341,801 B2 | 3/2008 | Reuter et al. |
| 7,377,947 B2 | 5/2008 | Merker et al. |
| 7,381,396 B2 | 6/2008 | Thomas et al. |
| 7,411,779 B2 | 8/2008 | Merker et al. |
| 7,419,926 B2 | 9/2008 | Schnitter et al. |
| 7,468,882 B2 | 12/2008 | Marek et al. |
| 7,515,396 B2 | 4/2009 | Biler |
| 7,974,077 B2 | 7/2011 | Matsuoka et al. |
| 8,259,436 B2 * | 9/2012 | Petrzilek et al. ............... 361/525 |
| 2007/0064376 A1 | 3/2007 | Merker et al. |
| 2008/0005878 A1 | 1/2008 | Merker et al. |
| 2008/0106852 A1 | 5/2008 | Amita et al. |
| 2009/0030149 A1 | 1/2009 | Morita et al. |
| 2009/0147449 A1 | 6/2009 | Matsuoka et al. |

FOREIGN PATENT DOCUMENTS

| | | |
|---|---|---|
| JP | 12161814 | 10/1989 |
| JP | 5055091 | 3/1993 |
| JP | 1128845 | 10/1999 |
| JP | 2004087713 | 3/2004 |
| WO | 2009/030615 A1 | 3/2009 |
| WO | 2009/047059 A1 | 4/2009 |
| WO | 2010/003874 A2 | 1/2010 |
| WO | 2010/003874 A3 | 1/2010 |

OTHER PUBLICATIONS

Abstract of Japanese Patent No. JP2002075807, Mar. 15, 2002.
Abstract of Japanese Patent No. JP2002164760, Jun. 7, 2002.
Abstract of Japanese Patent No. JP2003267404, Sep. 25, 2003.
Abstract of Japanese Patent No. JP10144573, May 29, 1998.
Abstract of Japanese Patent No. JP11274008, Oct. 8, 1999.
Abstract of Japanese Patent No. JP3145115, Jun. 20, 1991.
Abstract of Japanese Patent No. JP4236415, Aug. 25, 1992.
Abstract of Japanese Patent No. JP5234829, Sep. 10, 1993.
Abstract of Japanese Patent No. JP6168854, Jun. 14, 1994.
Abstract of Japanese Patent No. JP6232012, Aug. 19, 1994.
Abstract of Japanese Patent No. JP6283391, Oct. 7, 1994.
Abstract of Japanese Patent No. JP7183167, Jul. 21, 1995.
Abstract of Japanese Patent No. JP7183170, Jul. 21, 1995.
Abstract of Japanese Patent No. JP7240351, Sep. 12, 1995.
Abstract of Japanese Patent No. JP8115855, May 7, 1996.
Article—*Lowest ESR at High Voltage—Multianode Tantalum Capacitors*, Horacek et al., CARTS 2004: 24th Annual Capacitor and Resistor Technology Symposium, Mar. 29-Apr. 1 and Advancing Microelectronics, Jul./Aug. 2006, pp. 26-28.
Article—*Low ESR and Low Profile Technology on Niobium Oxide*, Zedniček et al.,CARTS 2004, CONF 24, pp. 223-231.
Article—*New Low Profile Low ESL Tantalum Multi-Anode Capacitor Concept Brings Better Cost versus Performance Value*, Zednicek et al., CARTS 2007, pp. 173-178.
Article—*New Low Profile Low ESL Multi-Anode "Mirror" Tantalum Capacitor*, Zednicek et al., CARTS 2008, 5 pages.
Article—*Performance and Reliability Study of High Voltage Tantalum Polymer Capacitors*, Young et al., CARTS 2010 Conference Proceedings, CARTS 2010 Conference, New Orleans, LA, Apr. 2010, pp. 1-13.
Great Britain Search Report for GB0705649.2, 1 page, May 15, 2007.
Poster—"Hitachi Tantalum Capacitor Development Road Map" Hitachi AIC Inc., CEATEC 2003, Japan, Oct. 7-11, 2003.
Product Information—NBM Multianodes OxiCap™ Ultra Low ESR Capacitor COTS-Plus from AVX, 2 pages.
Product Information—TPM Multianode—Tantalum Ultra Low ESR Capacitor from AVX, 3 pages.
Search Report for GB1109929.8 dated Oct. 11, 2011, 4 pages.

* cited by examiner

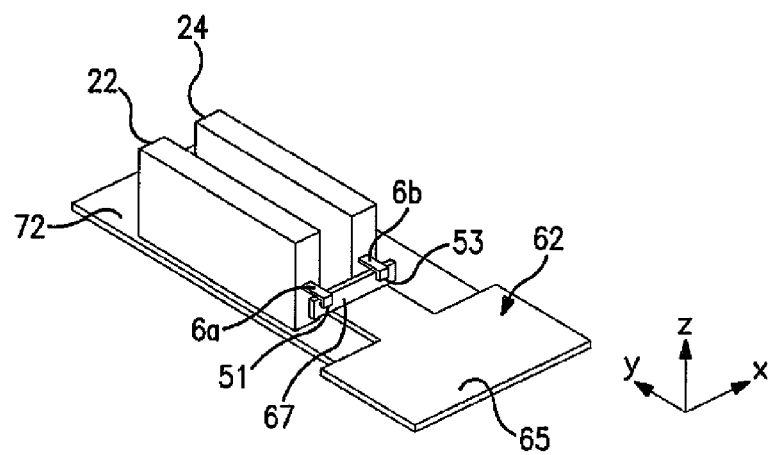
FIG. 1
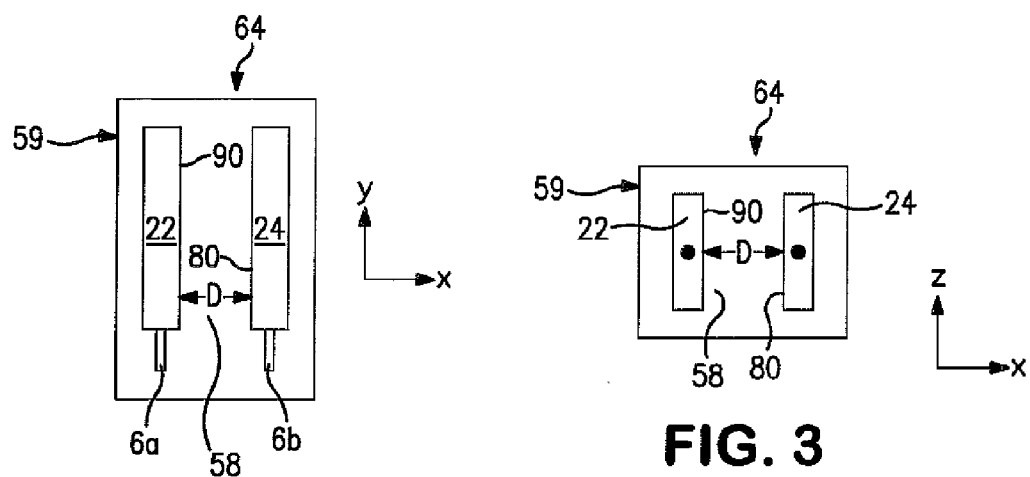
FIG. 2  FIG. 3

MECHANICALLY ROBUST SOLID ELECTROLYTIC CAPACITOR ASSEMBLY

RELATED APPLICATIONS

The present application is a continuation of U.S. application Ser. No. 12/849,187, filed on Aug. 3, 2010, which is incorporated herein in its entirety by reference thereto.

BACKGROUND OF THE INVENTION

Solid electrolytic capacitors (e.g., tantalum capacitors) have been a major contributor to the miniaturization of electronic circuits and have made possible the application of such circuits in extreme environments. Conventional solid electrolytic capacitors may be formed by pressing a metal powder (e.g., tantalum) around a metal lead wire, sintering the pressed part, anodizing the sintered anode, and thereafter applying a solid electrolyte. Intrinsically conductive polymers are often employed as the solid electrolyte due to their advantageous low equivalent series resistance ("ESR") and "non-burning/non-ignition" failure mode. Such electrolytes can be formed through in situ polymerization of the monomer in the presence of a catalyst and dopant. Alternative, premade conductive polymer slurries may also be employed. Regardless of how they are formed, one problem with conductive polymer electrolytes is that they are inherently weak, which can sometimes cause them to delaminate from the dielectric during formation of the capacitor or during its operation. This is particularly problematic in certain applications. For example, in switch-mode power supplies, micro-processors, and digital circuit applications, capacitors having reduced noise at high operating frequencies are often desired. To meet these requirements, capacitors of a very low ESR are usually required. One method that has been attempted to reduce the ESR of tantalum capacitors is to employ multiple capacitor elements within a single capacitor body. Unfortunately, however, the ability to use conductive polymer electrolytes in such multi-anode capacitors has been limited due to their poor strength and delamination tendency.

As such, a need remains for a solid electrolytic capacitor assembly that possesses good mechanical robustness and electrical performance.

SUMMARY OF THE INVENTION

In accordance with one embodiment of the present invention, a capacitor assembly is disclosed that comprises a first solid electrolytic capacitor element and a second solid electrolytic capacitor element, wherein the capacitor elements contain an anode, a dielectric coating overlying the anode that is formed by anodic oxidation, and a conductive polymer overlying the dielectric layer. The capacitor elements are juxtaposed so that the first capacitor element is spaced apart from the second capacitor element in a certain direction. The assembly also comprises an anode termination to which the first capacitor element and the second capacitor element are electrically connected, and a cathode termination to which the first capacitor element and the second capacitor element are electrically connected. A resinous material substantially fills the space defined between the first capacitor element and the second capacitor element.

In accordance with another embodiment of the present invention, a method for forming a capacitor assembly is disclosed. The method comprises positioning first and second capacitor elements on a lead frame so that the first capacitor element is spaced apart from the second capacitor element in a certain direction. The first capacitor element and the second capacitor element are electrically connected to a cathode termination, and anode leads of the first and second capacitor elements are electrically connected to an anode termination. The capacitor elements and terminations are positioned within a case, and a resinous material is applied to the case so that it fills the space between the first capacitor element and the second capacitor element.

Other features and aspects of the present invention are set forth in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which:

FIG. 1 is a perspective view of one embodiment of the capacitor assembly of the present invention;

FIG. 2 is a partial top view of the capacitor assembly of FIG. 1 in which the capacitor elements and the resinous material are illustrated; and FIG. 3 is a partial frontal view of the capacitor assembly of FIG. 1 in which the capacitor elements and the resinous material are illustrated.

Repeat use of reference characters in the present specification and drawings is intended to represent the same or analogous features or elements of the present invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention.

Generally speaking, the present invention is directed to an integrated capacitor assembly that contains at least two solid electrolytic capacitor elements electrically connected to common anode and cathode terminations. The capacitor elements contain an anode, a dielectric coating overlying the anode that is formed by anodic oxidation, and a conductive polymer solid electrolyte overlying the dielectric layer. The capacitor elements are spaced apart from each other a certain distance such that a resinous material can fill the space between the elements. In this manner, the present inventors believe that the resinous material can limit the expansion of the conductive polymer layer to such an extent that it does not substantially delaminate from the capacitor element. In addition to possessing mechanical stability, the capacitor assembly also possesses a combination of good electrical properties, such as low ESR, high capacitance, and a high dielectric breakdown voltage.

Various embodiments of the present invention will now be described in more detail.

I. Solid Electrolytic Capacitor Elements

A. Anode

The anode of the solid electrolytic capacitor elements may be formed from a valve metal composition having a specific charge broadly ranging from about 5,000 µF*V/g to about 300,000 µF*V/g. As will be described in more detail below, the capacitor of the present invention may be particularly suitable for use in high voltage applications. Such high voltage parts generally require the formation of a relatively thick dielectric layer that can grow between the spaces and pores of the anode particles. To optimize the ability to grow the dielectric in this manner, the anode may be formed from a powder having a low specific charge. That is, the powder may have a specific charge of less than about 70,000 microFarads*Volts per gram ("µF*V/g"), in some embodiments about 2,000 µF*V/g to about 65,000 µF*V/g, and in some embodiments, from about 5,000 to about 50,000 µF*V/g.

The valve metal composition contains a valve metal (i.e., metal that is capable of oxidation) or valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of 1:1.0±1.0, in some embodiments 1:1.0±0.3, in some embodiments 1:1.0±0.1, and in some embodiments, 1:1.0±0.05. For example, the niobium oxide may be $NbO_{0.7}$, $NbO_{1.0}$, $NbO_{1.1}$, and $NbO_2$. In a preferred embodiment, the composition contains $NbO_{1.0}$, which is a conductive niobium oxide that may remain chemically stable even after sintering at high temperatures. Examples of such valve metal oxides are described in U.S. Pat. No. 6,322,912 to Fife; U.S. Pat. No. 6,391,275 to Fife et al.; U.S. Pat. No. 6,416,730 to Fife et al.; U.S. Pat. No. 6,527,937 to Fife; U.S. Pat. No. 6,576,099 to Kimmel, et al.; U.S. Pat. No. 6,592,740 to Fife, et al.; and U.S. Pat. No. 6,639,787 to Kimmel, et al.; and U.S. Pat. No. 7,220,397 to Kimmel, et al., as well as U.S. Patent Application Publication Nos. 2005/0019581 to Schnitter; 2005/0103638 to Schnitter, et al.; 2005/0013765 to Thomas, et al., all of which are incorporated herein in their entirety by reference thereto for all purposes.

Conventional fabricating procedures may generally be utilized to form the anode body. In one embodiment, a tantalum or niobium oxide powder having a certain particle size is first selected. For example, the particles may be flaked, angular, nodular, and mixtures or variations thereof. The particles also typically have a screen size distribution of at least about 60 mesh, in some embodiments from about 60 to about 325 mesh, and in some embodiments, from about 100 to about 200 mesh. Further, the specific surface area is from about 0.1 to about 10.0 $m^2/g$, in some embodiments from about 0.5 to about 5.0 $m^2/g$, and in some embodiments, from about 1.0 to about 2.0 $m^2/g$. The term "specific surface area" refers to the surface area determined by the physical gas adsorption (B.E.T.) method of Bruanauer, Emmet, and Teller, Journal of American Chemical Society, Vol. 60, 1938, p. 309, with nitrogen as the adsorption gas. Likewise, the bulk (or Scott) density is typically from about 0.1 to about 5.0 $g/cm^3$, in some embodiments from about 0.2 to about 4.0 $g/cm^3$, and in some embodiments, from about 0.5 to about 3.0 $g/cm^3$.

To facilitate the construction of the anode body, other components may be added to the electrically conductive particles. For example, the electrically conductive particles may be optionally mixed with a binder and/or lubricant to ensure that the particles adequately adhere to each other when pressed to form the anode body. Suitable binders may include camphor, stearic and other soapy fatty acids, Carbowax (Union Carbide), Glyptal (General Electric), naphthalene, vegetable wax, microwaxes (purified paraffins), polymer binders (e.g., polyvinyl alcohol, polyethyl-2-oxazoline), etc), and so forth. The binder may be dissolved and dispersed in a solvent. Exemplary solvents may include water, alcohols, and so forth. When utilized, the percentage of binders and/or lubricants may vary from about 0.1% to about 8% by weight of the total mass. It should be understood, however, that binders and lubricants are not required in the present invention.

The resulting powder may be compacted using any conventional powder press mold. For example, the press mold may be a single station compaction press using a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. If desired, any binder/lubricant may be removed after compression by heating the pellet under vacuum at a certain temperature (e.g., from about 150° C. to about 500° C.) for several minutes. Alternatively, the binder/lubricant may also be removed by contacting the pellet with an aqueous solution, such as described in U.S. Pat. No. 6,197,252 to Bishop, et al., which is incorporated herein in its entirety by reference thereto for all purposes.

The thickness of the pressed anode body may be relatively thin, such as about 4 millimeters or less, in some embodiments, from about 0.05 to about 2 millimeters, and in some embodiments, from about 0.1 to about 1 millimeter. The shape of the anode body may also be selected to improve the electrical properties of the resulting capacitor. For example, the anode body may have a shape that is curved, sinusoidal, rectangular, U-shaped, V-shaped, etc. The anode body may also have a "fluted" shape in that it contains one or more furrows, grooves, depressions, or indentations to increase the surface to volume ratio to minimize ESR and extend the frequency response of the capacitance. Such "fluted" anodes are described, for instance, in U.S. Pat. No. 6,191,936 to Webber, et al.; U.S. Pat. No. 5,949,639 to Maeda, et al.; and U.S. Pat. No. 3,345,545 to Bourgault et al., as well as U.S. Patent Application Publication No. 2005/0270725 to Hahn, et al., all of which are incorporated herein in their entirety by reference thereto for all purposes.

If desired, an anode lead may also be attached to the anode body. The anode lead may be in the form of a wire, sheet, etc., and may be formed from a valve metal compound, such as tantalum, niobium, niobium oxide, etc. Attachment of the lead may be accomplished using known techniques, such as by welding the lead to the body or embedding it within the anode body during formation.

B. Dielectric

The anode body may be anodized so that a dielectric is formed over and/or within the anode. Anodization is an electrochemical process by which the anode is oxidized to form a material having a relatively high dielectric constant. For example, a tantalum anode may be anodized to tantalum pentoxide ($Ta_2O_5$). Typically, anodization is performed by initially applying an electrolyte to the anode, such as by dipping anode into the electrolyte. The electrolyte is generally in the form of a liquid, such as a solution (e.g., aqueous or non-aqueous), dispersion, melt, etc. A solvent is generally employed in the electrolyte, such as water (e.g., deionized water); ethers (e.g., diethyl ether and tetrahydrofuran); alcohols (e.g., methanol, ethanol, n-propanol, isopropanol, and butanol); triglycerides; ketones (e.g., acetone, methyl ethyl ketone, and methyl isobutyl ketone); esters (e.g., ethyl acetate, butyl acetate, diethylene glycol ether acetate, and methoxypropyl acetate); amides (e.g., dimethylformamide, dimethylacetamide, dimethylcaprylic/capric fatty acid amide and N-alkylpyrrolidones); nitriles (e.g., acetonitrile, propionitrile, butyronitrile and benzonitrile); sulfoxides or sulfones (e.g., dimethyl sulfoxide (DMSO) and sulfolane); and so forth. The solvent may constitute from about 50 wt. % to about 99.9 wt. %, in some embodiments from about 75 wt. % to about 99 wt. %, and in some embodiments, from about 80 wt. % to about 95 wt. % of the electrolyte. Although not necessarily required, the use of an aqueous solvent (e.g., water) is often desired to help achieve the desired oxide. In fact, water may constitute about 50 wt. % or more, in some embodiments, about 70 wt. % or more, and in some embodiments, about 90 wt. % to 100 wt. % of the solvent(s) used in the electrolyte.

The electrolyte is ionically conductive and may have an ionic conductivity of about 1 milliSiemens per centimeter ("mS/cm") or more, in some embodiments about 30 mS/cm or more, and in some embodiments, from about 40 mS/cm to about 100 mS/cm, determined at a temperature of 25° C. To enhance the ionic conductivity of the electrolyte, a compound may be employed that is capable of dissociating in the solvent to form ions. Suitable ionic compounds for this purpose may include, for instance, acids, such as hydrochloric acid, nitric acid, sulfuric acid, phosphoric acid, polyphosphoric acid, boric acid, boronic acid, etc.; organic acids, including carboxylic acids, such as acrylic acid, methacrylic acid, malonic acid, succinic acid, salicylic acid, sulfosalicylic acid, adipic acid, maleic acid, malic acid, oleic acid, gallic acid, tartaric acid, citric acid, formic acid, acetic acid, glycolic acid, oxalic acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; sulfonic acids, such as methanesulfonic acid, benzenesulfonic acid, toluenesulfonic acid, trifluoromethanesulfonic acid, styrenesulfonic acid, naphthalene disulfonic acid, hydroxybenzenesulfonic acid, dodecylsulfonic acid, dodecylbenzenesulfonic acid, etc.; polymeric acids, such as poly(acrylic) or poly(methacrylic) acid and copolymers thereof (e.g., maleic-acrylic, sulfonic-acrylic, and styrene-acrylic copolymers), carageenic acid, carboxymethyl cellulose, alginic acid, etc.; and so forth. The concentration of ionic compounds is selected to achieve the desired ionic conductivity. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the electrolyte. If desired, blends of ionic compounds may also be employed in the electrolyte.

A current is passed through the electrolyte to form the dielectric layer. The value of voltage manages the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the surface of the anode. Of course, other known methods may also be employed, such as pulse or step potentiostatic methods. The voltage typically ranges from about 4 to about 200 V, and in some embodiments, from about 9 to about 100 V. During anodic oxidation, the electrolyte can be kept at an elevated temperature, such as about 30° C. or more, in some embodiments from about 40° C. to about 200° C., and in some embodiments, from about 50° C. to about 100° C. Anodic oxidation can also be done at ambient temperature or lower. The resulting dielectric layer may be formed on a surface of the anode and within its pores.

C. Solid Electrolyte

The solid electrolyte overlies the dielectric and is formed from one or more conductive polymer layers. The conductive polymer(s) employed in such layers are typically π-conjugated and have an intrinsic electrical conductivity after oxidation or reduction, such as an electrical conductivity of at least about 1 μS cm$^{-1}$ after oxidation. Examples of such π-conjugated conductive polymers include, for instance, polyheterocycles (e.g., polypyrroles, polythiophenes, polyanilines, etc.), polyacetylenes, poly-p-phenylenes, polyphenolates, and so forth. Suitable polythiophenes may include, for instance, polythiophene and derivatives thereof, such as poly (3,4-ethylenedioxythiophene) ("PEDT"). In one particular embodiment, a polythiophene derivative is employed with recurring units of general formula (I) or formula (II) or recurring units of general formulae (I) and (II):

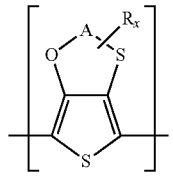

(I)

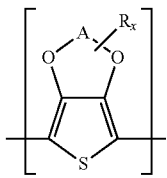

(II)

wherein,

A is an optionally substituted $C_1$ to $C_5$ alkylene radical (e.g., methylene, ethylene, n-propylene, n-butylene, n-pentylene, etc.);

R is a linear or branched, optionally substituted $C_1$ to $C_{18}$ alkyl radical (e.g., methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl, n-octadecyl, etc.); optionally substituted $C_5$ to $C_{12}$ cycloalkyl radical (e.g., cyclopentyl, cyclohexyl, cycloheptyl, cyclooctyl, cyclononyl cyclodecyl, etc.); optionally substituted $C_6$ to $C_{14}$ aryl radical (e.g., phenyl, naphthyl, etc.); optionally substituted $C_7$ to $C_{18}$ aralkyl radical (e.g., benzyl, o-, m-, p-tolyl, 2,3-, 2,4-, 2,5-, 2-6, 3-4-, 3,5-xylyl, mesityl, etc.); optionally substituted $C_1$ to $C_4$ hydroxyalkyl radical, or hydroxyl radical; and x is an integer from 0 to 8, in some embodiments, from 0 to 2, and in some embodiments, x is 0. Example of substituents for the radicals "A" or "R" include, for instance, alkyl, cycloalkyl, aryl, aralkyl, alkoxy, halogen, ether, thioether, disulphide, sulfoxide, sulfone, sulfonate, amino, aldehyde, keto, carboxylic acid ester, carboxylic acid, carbonate, carboxylate, cyano, alkylsilane and alkoxysilane groups, carboxylamide groups, and so forth.

The total number of recurring units of general formula (I) or formula (II) or of general formulae (I) and (II) is typically from 2 to 2,000, and in some embodiments, from 2 to 100.

Particularly suitable polythiophene derivatives are those in which "A" is an optionally substituted $C_2$ to $C_3$ alkylene radical and x is 0 or 1. In one particular embodiment, the polythiophene derivative is PEDT and has recurring units of formula (II), wherein "A" is $CH_2$—$CH_2$ and "x" is 0. Methods for forming such polythiophene derivatives are well known in the art and described, for instance, in U.S. Pat. No. 6,987,663 to Merker, et al., which is incorporated herein in its entirety by reference thereto for all purposes. For example, the polythiophene derivatives may be formed from a monomeric precursor, such as optionally substituted thiophenes. Particularly suitable monomeric precursors are substituted 3,4-alkylenedioxythiophenes having the general formula (III), (IV) or a mixture of thiophene of general formulae (III) and (IV):

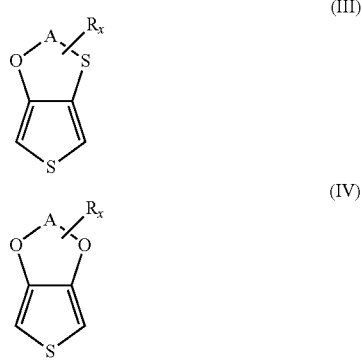

wherein, A, R, and X are as defined above.

Examples of such monomeric precursors include, for instance, optionally substituted 3,4-ethylenedioxythiophenes. Derivatives of these monomeric precursors may also be employed that are, for example, dimers or trimers of the above monomeric precursors. Higher molecular derivatives, i.e., tetramers, pentamers, etc. of the monomeric precursors are suitable for use in the present invention. The derivatives may be made up of identical or different monomer units and used in pure form and in a mixture with one another and/or with the monomeric precursors. Oxidized or reduced forms of these precursors may also be employed.

To produce the desired conductive polymer, monomeric precursors, such as described above, typically undergo oxidative polymerization in the presence of an oxidizing agent. The oxidizing agent may be a transition metal salt, such as a salt of an inorganic or organic acid that contain iron(III), copper(II), chromium(VI), cerium(IV), manganese(IV), manganese(VII), or ruthenium(III) cations. Particularly suitable transition metal salts include iron(III) cations, such as iron(III) halides (e.g. $FeCl_3$) or iron(III) salts of other inorganic acids, such as $Fe(ClO_4)_3$ or $Fe_2(SO_4)_3$ and the iron(III) salts of organic acids and inorganic acids comprising organic radicals. Examples of iron (III) salts of inorganic acids with organic radicals include, for instance, iron(III) salts of sulfuric acid monoesters of $C_3$ to $C_{20}$ alkanols (e.g., iron(III) salt of lauryl sulfate). Likewise, examples of iron(III) salts of organic acids include, for instance, iron(III) salts of $C_1$ to $C_{20}$ alkane sulfonic acids (e.g., methane, ethane, propane, butane, or dodecane sulfonic acid); iron (III) salts of aliphatic perfluorosulfonic acids (e.g., trifluoromethane sulfonic acid, perfluorobutane sulfonic acid, or perfluorooctane sulfonic acid); iron (III) salts of aliphatic $C_1$ to $C_{20}$ carboxylic acids (e.g., 2-ethylhexylcarboxylic acid); iron (III) salts of aliphatic perfluorocarboxylic acids (e.g., trifluoroacetic acid or perfluorooctane acid); iron (III) salts of aromatic sulfonic acids optionally substituted by $C_1$ to $C_{20}$ alkyl groups (e.g., benzene sulfonic acid, o-toluene sulfonic acid, p-toluene sulfonic acid, or dodecylbenzene sulfonic acid); iron (III) salts of cycloalkane sulfonic acids (e.g., camphor sulfonic acid); and so forth. Mixtures of these above-mentioned iron(III) salts may also be used. Iron(III)-p-toluene sulfonate, iron(III)-o-toluene sulfonate, and mixtures thereof, are particularly suitable for use in the present invention.

Various methods may be utilized to apply the solid electrolyte onto the anode part. In one embodiment, the oxidizing agent and monomeric precursor are applied, either sequentially or together, such that the polymerization reaction occurs in situ on the part. Suitable application techniques may include screen-printing, dipping, electrophoretic coating, and spraying, may be used to form a conductive polymer coating. As an example, the monomeric precursor (e.g., 3,4-ethylenedioxy-thiophene) may initially be mixed with the oxidizing agent to form a solution. One suitable oxidizing agent is CLEVIOS™ C, which is iron III toluene-sulfonate and sold by H. C. Starck. CLEVIOS™ C is a commercially available catalyst for CLEVIOS™ M, which is 3,4-ethylene dioxythiophene, a PEDT monomer also sold by H. C. Starck. Once the mixture is formed, the anode part may then be dipped into the solution so that the polymer forms on the surface of the anode part. Alternatively, the oxidizing agent and precursor may also be applied separately to the anode part. In one embodiment, for example, the oxidizing agent is dissolved in an organic solvent (e.g., butanol) and then applied to the anode part as a dipping solution. The anode part may then be dried to remove the solvent therefrom. Thereafter, the anode part may be dipped into a solution containing the appropriate monomer.

As the monomer contacts the surface of the anode part containing the oxidizing agent, it may chemically polymerize thereon. Polymerization may be performed at temperatures of from about −10° C. to about 250° C., and in some embodiments, from about 0° C. to about 200° C., depending on the oxidizing agent used and desired reaction time. Suitable polymerization techniques, such as described above, may be described in more detail in U.S. Publication No. 2008/232037 to Biler. Still other methods for applying such conductive polymer coating(s) may be described in U.S. Pat. No. 5,457,862 to Sakata, et al., U.S. Pat. No. 5,473,503 to Sakata, et al., U.S. Pat. No. 5,729,428 to Sakata, et al., and U.S. Pat. No. 5,812,367 to Kudoh, et al., which are incorporated herein in their entirety by reference thereto for all purposes.

In addition to in situ application, the solid electrolyte may also be applied to the part in the form of a dispersion of pre-polymerized solid conductive polymer particles. Although their size may vary, it is typically desired that the particles possess a small diameter to increase the surface area available for adhering to the anode part. For example, the particles may have an average diameter of from about 1 to about 500 nanometers, in some embodiments from about 5 to about 400 nanometers, and in some embodiments, from about 10 to about 300 nanometers. The $D_{90}$ value of the particles (particles having a diameter of less than or equal to the $D_{90}$ value constitute 90% of the total volume of all of the solid particles) may be about 15 micrometers or less, in some embodiments about 10 micrometers or less, and in some embodiments, from about 1 nanometer to about 8 micrometers. The diameter of the particles may be determined using known techniques, such as by ultracentrifuge, laser diffraction, etc.

The formation of the conductive polymers into a particulate form may be enhanced by using a separate counterion to counteract a charged conductive polymer (e.g., polythiophene). That is, the conductive polymer (e.g., polythiophene or derivative thereof) used in the solid electrolyte typically has a charge on the main polymer chain that is neutral or positive (cationic). Polythiophene derivatives, for instance, typically carry a positive charge in the main polymer chain. In some cases, the polymer may possess positive and negative charges in the structural unit, with the positive charge being located on the main chain and the negative charge optionally on the substituents of the radical "R", such as sulfonate or carboxylate groups. The positive charges of the main chain may be partially or wholly saturated with the optionally present anionic groups on the radicals "R." Viewed overall, the polythiophenes may, in these cases, be cationic, neutral or even anionic. Nevertheless, they are all regarded as cationic polythiophenes as the polythiophene main chain has a positive charge.

The counterion may be a monomeric or polymeric anion. Polymeric anions can, for example, be anions of polymeric carboxylic acids (e.g., polyacrylic acids, polymethacrylic acid, polymaleic acids, etc.); polymeric sulfonic acids (e.g., polystyrene sulfonic acids ("PSS"), polyvinyl sulfonic acids, etc.); and so forth. The acids may also be copolymers, such as copolymers of vinyl carboxylic and vinyl sulfonic acids with other polymerizable monomers, such as acrylic acid esters and styrene. Likewise, suitable monomeric anions include, for example, anions of $C_1$ to $C_{20}$ alkane sulfonic acids (e.g., dodecane sulfonic acid); aliphatic perfluorosulfonic acids (e.g., trifluoromethane sulfonic acid, perfluorobutane sulfonic acid or perfluorooctane sulfonic acid); aliphatic $C_1$ to $C_{20}$ carboxylic acids (e.g., 2-ethyl-hexylcarboxylic acid); aliphatic perfluorocarboxylic acids (e.g., trifluoroacetic acid or perfluorooctanoic acid); aromatic sulfonic acids optionally substituted by $C_1$ to $C_{20}$ alkyl groups (e.g., benzene sulfonic acid, o-toluene sulfonic acid, p-toluene sulfonic acid or dodecylbenzene sulfonic acid); cycloalkane sulfonic acids (e.g., camphor sulfonic acid or tetrafluoroborates, hexafluorophosphates, perchlorates, hexafluoroantimonates, hexafluoroarsenates or hexachloroantimonates); and so forth. Particularly suitable counteranions are polymeric anions, such as a polymeric carboxylic or sulfonic acid (e.g., polystyrene sulfonic acid ("PSS")). The molecular weight of such polymeric anions typically ranges from about 1,000 to about 2,000,000, and in some embodiments, from about 2,000 to about 500,000.

When employed, the weight ratio of such counterions to conductive polymers in a given layer of the solid electrolyte is typically from about 0.5:1 to about 50:1, in some embodiments from about 1:1 to about 30:1, and in some embodiments, from about 2:1 to about 20:1. The weight of the electrically conductive polymers corresponds referred to the above-referenced weight ratios refers to the weighed-in portion of the monomers used, assuming that a complete conversion occurs during polymerization.

In addition to conductive polymer(s) and optional counterion(s), the dispersion may also contain one or more binders to further enhance the adhesive nature of the polymeric layer and also increase the stability of the particles within the dispersion. The binders may be organic in nature, such as polyvinyl alcohols, polyvinyl pyrrolidones, polyvinyl chlorides, polyvinyl acetates, polyvinyl butyrates, polyacrylic acid esters, polyacrylic acid amides, polymethacrylic acid esters, polymethacrylic acid amides, polyacrylonitriles, styrene/acrylic acid ester, vinyl acetate/acrylic acid ester and ethylene/vinyl acetate copolymers, polybutadienes, polyisoprenes, polystyrenes, polyethers, polyesters, polycarbonates, polyurethanes, polyamides, polyimides, polysulfones, melamine formaldehyde resins, epoxide resins, silicone resins or celluloses. Crosslinking agents may also be employed to enhance the adhesion capacity of the binders. Such crosslinking agents may include, for instance, melamine compounds, masked isocyanates or functional silanes, such as 3-glycidoxypropyltrialkoxysilane, tetraethoxysilane and tetraethoxysilane hydrolysate or crosslinkable polymers, such as polyurethanes, polyacrylates or polyolefins, and subsequent crosslinking.

Dispersion agents may also be employed to facilitate the formation of the solid electrolyte and the ability to apply it to the anode part. Suitable dispersion agents include solvents, such as aliphatic alcohols (e.g., methanol, ethanol, i-propanol and butanol), aliphatic ketones (e.g., acetone and methyl ethyl ketones), aliphatic carboxylic acid esters (e.g., ethyl acetate and butyl acetate), aromatic hydrocarbons (e.g., toluene and xylene), aliphatic hydrocarbons (e.g., hexane, heptane and cyclohexane), chlorinated hydrocarbons (e.g., dichloromethane and dichloroethane), aliphatic nitrites (e.g., acetonitrile), aliphatic sulfoxides and sulfones (e.g., dimethyl sulfoxide and sulfolane), aliphatic carboxylic acid amides (e.g., methylacetamide, dimethylacetamide and dimethylformamide), aliphatic and araliphatic ethers (e.g., diethylether and anisole), water, and mixtures of any of the foregoing solvents. A particularly suitable dispersion agent is water.

In addition to those mentioned above, still other ingredients may also be used in the dispersion. For example, conventional fillers may be used that have a size of from about 10 nanometers to about 100 micrometers, in same embodiments from about 50 nanometers to about 50 micrometers, and in some embodiments, from about 100 nanometers to about 30 micrometers. Examples of such fillers include calcium carbonate, silicates, silica, calcium or barium sulfate, aluminum hydroxide, glass fibers or bulbs, wood flour, cellulose powder carbon black, electrically conductive polymers, etc. The fillers may be introduced into the dispersion in powder form, but may also be present in another form, such as fibers.

Surface-active substances may also be employed in the dispersion, such as ionic or non-ionic surfactants. Furthermore, adhesives may be employed, such as organofunctional silanes or their hydrolysates, for example 3-glycidoxypropyltrialkoxysilane, 3-aminopropyl-triethoxysilane, 3-mercaptopropyl-trimethoxysilane, 3-metacryloxypropyltrimethoxysilane, vinyltrimethoxysilane or octyltriethoxysilane. The dispersion may also contain additives that increase conductivity, such as ether group-containing compounds (e.g., tetrahydrofuran), lactone group-containing compounds (e.g., γ-butyrolactone or γ-valerolactone), amide or lactam group-containing compounds (e.g., caprolactam, N-methylcaprolactam, N,N-dimethylacetamide, N-methylacetamide, N,N-dimethylformamide (DMF), N-methylformamide, N-methylformanilide, N-methylpyrrolidone (NMP), N-octylpyrrolidone, or pyrrolidone), sulfones and sulfoxides (e.g., sulfolane (tetramethylenesulfone) or dimethylsulfoxide (DMSO)), sugar or sugar derivatives (e.g., saccharose, glucose, fructose, or lactose), sugar alcohols (e.g., sorbitol or mannitol), furan derivatives (e.g., 2-furancarboxylic acid or 3-furancarboxylic acid), an alcohols (e.g., ethylene glycol, glycerol, di- or triethylene glycol).

The polymeric dispersion may be applied by to the part using a variety of known techniques, such as by spin coating, impregnation, pouring, dropwise application, injection, spraying, doctor blading, brushing or printing (e.g., ink-jet, screen, or pad printing). Although it may vary depending on the application technique employed, the viscosity of the dispersion is typically from about 0.1 to about 100,000 mPas (measured at a shear rate of 100 $s^{-1}$), in some embodiments from about 1 to about 10,000 mPas, in some embodiments from about 10 to about 1,500 mPas, and in some embodiments, from about 100 to about 1000 mPas. Once applied, the layer may be dried and washed.

One benefit of employing such a dispersion is that it may be able to penetrate into the edge region of the capacitor body to increase the adhesion to the dielectric. This results in a more mechanically robust part, which may reduce equivalent series resistance and leakage current. Such dispersions may also minimize the presence of ionic species (e.g., $Fe^{2+}$ or $Fe^{3+}$) produced during in situ polymerization, which can cause dielectric breakdown under high electric field due to ionic migration. Thus, by applying the conductive polymer as a dispersion rather through in situ polymerization, the resulting capacitor may exhibit a relatively high "breakdown voltage" (voltage at which the capacitor fails), such as about 60 volts or more, in some embodiments about 80 volts or more, in some embodiments about 100 volts or more, and in some embodiments, from about 120 volts to about 200 volts, as determined by increasing the applied voltage in increments of 3 volts until the leakage current reaches 1 mA.

As indicated above, the solid electrolyte may be formed from one or multiple layers. When multiple layers are employed, they may be formed from a conductive polymer that is formed in situ and/or from a polymeric dispersion. Each layer may be formed using one or more coating steps. Regardless of the number of layers employed, the resulting solid electrolyte typically has a total a thickness of from about 1 micrometer (μm) to about 200 μm, in some embodiments from about 2 μm to about 50 μm, and in some embodiments, from about 5 μm to about 30 μm.

The layer(s) of the solid electrolyte may also be healed upon application to the anode part. Healing may occur after each application of a solid electrolyte layer or may occur after the application of the entire coating if multiple layers are employed. In some embodiments, for example, the solid electrolyte may be healed by dipping the pellet into an electrolyte solution, such as a solution of acid, and thereafter applying a constant voltage to the solution until the current is reduced to a preselected level. If desired, such healing may be accomplished in multiple steps. After application of some or all of the layers described above, the resulting part may then be washed if desired to remove various byproducts, excess oxidizing agents, and so forth. Further, in some instances, drying may be utilized after some or all of the dipping operations described above. For example, drying may be desired after applying the oxidizing agent and/or after washing the pellet in order to open the pores of the part so that it can receive a liquid during subsequent dipping steps.

E. External Coating

The solid electrolytic capacitor elements may also contain an external coating that overlies the solid electrolyte. The external coating may contain at least one carbonaceous layer and at least one metal layer that overlies the carbonaceous layer. The metal layer may act as a solderable conductor, contact layer, and/or charge collector for the capacitor, and may be formed from a conductive metal, such as copper, nickel, silver, nickel, zinc, tin, palladium, lead, copper, aluminum, molybdenum, titanium, iron, zirconium, magnesium, and alloys thereof. Silver is a particularly suitable conductive metal for use in the layer. The carbonaceous layer may limit contact between the metal layer and the solid electrolyte, which would otherwise increase the resistance of the capacitor. The carbonaceous layer may be formed from a variety of known carbonaceous materials, such as graphite, activated carbon, carbon black, etc. The thickness of the carbonaceous layer is typically within the range of from about 1 μm to about 50 μm, in some embodiments from about 2 μm to about 30 μm, and in some embodiments, from about 5 μm to about 10 μm. Likewise, the thickness of the metal layer is typically within the range of from about 1 μm to about 100 μm, in some embodiments from about 5 μm to about 50 μm, and in some embodiments, from about 10 μm to about 25 μm.

II. Resinous Material

The resinous material is employed in the present invention to fill the space between two or more juxtaposed capacitor elements. The same or a different material may likewise encapsulate or cover the elements and form a protective case for the capacitor assembly as is well known in the art. Although any resinous material may be employed, it is generally desired to use a resin that is a curable thermosetting resin, such as an epoxy resin, melamine resin, maleimide resin, polyimide resin, phenolic resin, etc. Epoxy resins are particularly suitable for use in the present invention. Examples of suitable epoxy resins include, for instance, glycidyl ether type epoxy resins, such as bisphenol A type epoxy resins, bisphenol F type epoxy resins, phenol novolac type epoxy resins, orthocresol novolac type epoxy resins, brominated epoxy resins and biphenyl type epoxy resins, cyclic aliphatic epoxy resins, glycidyl ester type epoxy resins, glycidylamine type epoxy resins, cresol novolac type epoxy resins, naphthalene type epoxy resins, phenol aralkyl type epoxy resins, cyclopentadiene type epoxy resins, heterocyclic epoxy resins, etc. Still other additives may also be employed in the resinous material, such as curing agents, photoinitiators, viscosity modifiers, suspension aiding agents, pigments, stress reducing agents, coupling agents (e.g., silane coupling agents), nonconductive fillers (e.g., clay, silica, alumina, etc.), stabilizers, etc.

III. Assembly of Capacitor Elements

Any number of solid electrolytic capacitor elements, such as described above, may be employed in the present invention. For example, the capacitor assembly may contain from 2 to 8 capacitor elements (e.g., 2, 3, or 4), in some embodiments from 2 to 4 capacitor elements, and in one particular embodiment, 2 capacitor elements.

Referring to FIGS. 1-3, one particular embodiment of a capacitor assembly 64 that contains two capacitor elements is shown and will now be described in more detail. More particularly, the capacitor assembly 64 includes a first solid electrolytic capacitor element 22 in electrical communication with a second solid electrolytic capacitor element 24. In this embodiment, the capacitor elements have a generally rectangular prismatic shape and are aligned so that their major surfaces (i.e., having the largest areas) are in juxtaposition with each other. That is, a surface 90 of the solid electrolytic capacitor element 22 defined by its width (−x direction) and length (−y direction) faces a corresponding major surface 80 of the solid electrolytic capacitor element 24. The capacitor elements 22 and 24 may be positioned in a vertical configuration in which the surfaces 80 and 90 are provided in a plane that is substantially parallel to the −z direction, as well as in a horizontal configuration in which the surfaces 80 and 90 are provided in a plane that is substantially perpendicular to the −z direction. In the embodiment depicted, for example, the capacitor elements 22 and 24 are vertically positioned in a plane parallel to the −z direction. It should be understood that the capacitor elements 22 and 24 need not extend in the same direction. For example, the surface 90 of the capacitor element 22 may be provided in a plane that is substantially perpendicular to the −x direction, while the surface 80 of the capacitor element 24 is provided in a plane that is substantially perpendicular to the −y direction. Desirably, however, both capacitor elements 22 and 24 extend in substantially the same direction.

Regardless of their particular geometric configuration, the capacitor elements are spaced apart from each other in a certain direction so that the resinous material can be disposed therebetween. The distance that the capacitor elements are spaced apart is generally large enough to provide the desired stabilizing affect on the conductive polymer layers, yet small enough to avoid a significant reduction in volumetric efficiency. For example, the ratio of the distance between two juxtaposed capacitor elements and the overall dimension of the capacitor assembly (in the direction in which the elements are spaced apart) is typically from about 0.01 to about 0.1, in some embodiments from about 0.01 to about 0.05, and in some embodiments from about 0.015 to about 0.02. As shown in FIGS. 1-3, for example, the capacitor elements 22 and 24 are spaced apart a distance "D" from each other in the −x direction. In this embodiment, the aforementioned ratio is defined by the dividing the distance "D" by the width of the capacitor assembly 64 in the −x direction. Of course, the actual distance that the elements are spaced part will generally vary depending on the case size of the capacitor assembly. Just as an example, two capacitor elements may be spaced apart by a distance of from about 40 micrometers to about 100 micrometers, in some embodiments from about 50 micrometers to about 90 micrometers, and in some embodiments, from about 60 micrometers to about 70 micrometers.

In addition to the solid electrolytic capacitor elements themselves, the capacitor assembly also contains an anode termination to which anode leads of respective capacitor elements are electrically connected. Typically, the anode leads are substantially parallel to each other and face the same side. In this manner, the anode leads are placed in a juxtaposed relationship, which may improve the efficiency by which the leads may be connected to the anode termination. The anode leads may also be positioned in substantial horizontal alignment (i.e., in the −y direction), which enhances the dimensional stability of the capacitor assembly. This may be accomplished, for instance, by connecting one anode lead to an upper region of the anode termination and another anode lead to a lower region of the anode termination. The capacitor assembly also contains a cathode termination to which the cathode of the solid electrolytic capacitor elements is electrically connected.

Any conductive material may be employed to form the terminations, such as a conductive metal (e.g., copper, nickel, silver, nickel, zinc, tin, palladium, lead, copper, aluminum, molybdenum, titanium, iron, zirconium, magnesium, and alloys thereof). Particularly suitable conductive metals include, for instance, copper, copper alloys (e.g., copper-zirconium, copper-magnesium, copper-zinc, or copper-iron), nickel, and nickel alloys (e.g., nickel-iron). The thickness of the terminations is generally selected to minimize the thickness of the capacitor. For instance, the thickness of the terminations may range from about 0.05 to about 1 millimeter, in some embodiments from about 0.05 to about 0.5 millimeters, and from about 0.07 to about 0.2 millimeters. The terminations may be connected using any technique known in the art, such as welding, adhesive bonding, etc. In one embodiment, for example, a conductive adhesive may initially be applied to a surface of the anode and/or cathode terminations. The conductive adhesive may include, for instance, conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives may be described in U.S. Patent Application Publication No. 2006/0038304 to Osako, et al., which is incorporated herein in its entirety by reference thereto for all purposes.

Referring again to FIGS. 1-3, for example, the solid electrolytic capacitor elements 22 and 24 are shown connected in parallel to common electrical terminations 72 and 62 to form the capacitor assembly 64. More particularly, the capacitor assembly 64 contains a cathode termination 72 that is electrically connected to the cathode of the capacitor elements 22 and 24. In this particular embodiment, the cathode termination 72 is initially provided in a plane that is generally parallel to the bottom surface of the capacitor elements. As discussed in more detail below, however, the cathode termination 72 may be subsequently bent after encapsulation to form an exposed portion for mounting. Thus, although a portion of the cathode termination 72 may generally remain parallel to the bottom surface, an exposed portion may be positioned at any of a variety of angles (e.g., perpendicular) in the final capacitor assembly 64 based on the manner in which it is bent.

The capacitor assembly 64 also includes an anode termination 62 that is formed from a first portion 65 and a second portion 67. As shown in FIG. 1, the first portion 65 is integral with the second portion 67. It should be understood, however, that these portions 65 and 67 may alternatively be separate pieces that are connected together, either directly or via an additional conductive element (e.g., metal). In the illustrated embodiment, the first portion 65 is initially provided in a plane that is substantially parallel to the bottom surface of the capacitor elements. As discussed above, however, the first portion 65 may be subsequently bent to form a mounting terminal. The second portion 67 of the anode termination 62 is provided in a plane that is generally perpendicular to the bottom surface of the capacitor elements. The second portion 67 possesses an upper region 51 that is electrically connected to the anode lead 6a and a lower region 53 that is electrically connected to the anode lead 6b. As shown, the second portion 67 holds the anode leads 6a and 6b in substantial horizontal alignment (i.e., in the −x direction) to further enhance the dimensional stability of the capacitor assembly 64. The regions 51 and 53 may also have a "U-shape" for further enhancing surface contact and mechanical stability of the leads 6a and 6b.

Once attached, the capacitor elements, anode termination, and cathode termination may be placed within a case, which may have any size desired, such as a "D" case (7.3 mm×4.3 mm×2.9 mm), "E" case (7.3 mm×4.3 mm×4.1 mm), "V" case (7.3 mm×6.1 mm×3.5 mm), or "Y" case (7.3 mm×4.3 mm×2.0 mm). The case may be filled with the resinous material so that it flows between and around the capacitor elements. The resinous material may then be cured as is known in the art to form a rigid protective sheath. Referring again to FIGS. 1-3, for example, the capacitor assembly 64 contains a protective sheath 59 formed by a resinous material 58, which is positioned between and around the capacitor elements 22 and 24. After encapsulation, exposed portions of the respective anode and cathode terminations 62 and 72 (not shown herein) are trimmed and bent along the outside of the sheath 59 (e.g., at an approximately 90° angle). In this manner, the portions can form J-shaped leads for the finished capacitor assembly 64, although any other known configuration may also be formed in accordance with the present invention.

As a result of the present invention, a capacitor assembly may be formed that exhibits excellent electrical properties. The equivalent series resistance of the capacitor assembly may be about 100 milliohms or less, in some embodiments about 50 milliohms or less, and in some embodiments, from about 0.1 to about 35 milliohms, as measured with a 2.2 volt DC bias and a 0.5 volt peak to peak sinusoidal signal, free of harmonics, at a frequency of 100 kHz. It is also believed that the dissipation factor (DF) of the capacitor assembly may also be maintained at relatively low levels. The dissipation factor (DF) generally refers to losses that occur in the capacitor assembly and is usually expressed as a percentage of the ideal performance. For example, the dissipation factor of a capacitor assembly of the present invention is typically about 10% or less, and in some embodiments, from about 0.1% to about 5%, measured at a frequency of 120 Hz. In addition, the leakage current, which generally refers to the current flowing from one conductor to an adjacent conductor through an insulator, can be maintained at relatively low levels. For example, the leakage current may be about 2 μA or less, in some embodiments about 1 μA or less, and in some embodiments, from about 0.01 to about 0.5 μA. Likewise, the capacitance of the assembly may range from about 1 to about 100 μF, in some embodiments from about 150 to about 1,500 μF, and in some embodiments, from about 200 to about 800 μF, measured at a frequency of 120 Hz.

The present invention may be better understood by reference to the following examples.

Test Procedures

Equivalent Series Resistance (ESR)

Equivalence series resistance may be measured using a Keithley 3330 Precision LCZ meter with Kelvin Leads 2.2 volt DC bias and a 0.5 volt peak to peak sinusoidal signal. The operating frequency was 100 kHz and the temperature was 23° C.±2° C.

Capacitance

The capacitance was measured using a Keithley 3330 Precision LCZ meter with Kelvin Leads with 2.2 volt DC bias and a 0.5 volt peak to peak sinusoidal signal. The operating frequency was 120 Hz and the temperature was 23° C.±2° C.

Leakage Current:

Leakage current ("DCL") was measured using a leakage test set that measures leakage current at a temperature of 25° C. and at the rated voltage after a minimum of 60 seconds.

EXAMPLE 1

A tantalum anode with a size of 4.3 mm×3.1 mm×2.7 mm was anodized at 140V in a liquid electrolyte to 22 μF. A conductive polymer coating was then formed by dipping the anode into a solution of iron (III) toluenesulfonate (Clevios™ C, H. C. Starck) for 5 minutes and consequently into 3,4-ethylenedioxythiophene (Clevios™ M, H. C. Starck) for 1 minute. After 45 minutes of polymerization, a thin layer of poly(3,4-ethylenedioxythiophene) was formed on the surface of the dielectric. The parts were washed in methanol to remove reaction by-products, anodized in a liquid electrolyte, and washed again in methanol. The polymerization cycle was repeated 12 times. The parts were then coated by graphite and silver and assembled by gluing the anodes into a leadframe pocket, cutting and laser welding the anode wire into the leadframe upstand, and molding the capacitor.

EXAMPLE 2

A tantalum anode with a size of 4.3 mm×3.1 mm×2.7 mm anodized at 140V in a liquid electrolyte to 22 μF. A conductive polymer coating was then formed by dipping the anode into a dispersed poly(3,4-ethylenedioxythiophene) having a solids content of 1.1% (Clevios™ K, H. C. Starck). Upon coating, the part was then dried at 125° C. for 20 minutes. This process was repeated 8 times. Thereafter, the part was dipped into a dispersed poly(3,4-ethylenedioxythiophene) having a solids content of 2% and dried at 125° C. for 20 minutes. Once again, this process was repeated 6 times. The parts were then coated by graphite and silver and assembled in the same manner as described in Example 1.

EXAMPLE 3

A tantalum anode with a size of 4.1 mm×3.1 mm×1.0 mm was anodized at 140V in a liquid electrolyte to 7 μF. A conductive polymer coating was then formed by dipping the anode into a dispersed poly(3,4-ethylenedioxythiophene) having a solids content of 1.1% (Clevios™ K, H. C. Starck). Upon coating, the part was then dried at 125° C. for 20 minutes. This process was repeated 6 times. Thereafter, the part was dipped into a dispersed poly(3,4-ethylenedioxythiophene) having a solids content of 2% and dried at 125° C. for 20 minutes. Once again, this process was repeated 6 times. The parts were then coated by graphite and silver. Thereafter, two of these parts were vacuum "picked and placed" vertically onto a leadframe paddle as shown in FIGS. 1-3. A silver adhesive was dispensed on the leadframe paddle (negative termination) to ensure adhesion of the capacitor elements. The positive termination of the leadframe was designed to have multiple slots to accommodate the leadwires, which were laser welded thereto. Thereafter, the capacitor was encapsulated so that the molding resin flowed around and in-between the elements.

The finished capacitors of Examples 1-3 were then tested for electrical performance (i.e., leakage current, ESR, and capacitance). Also, to determine the stability of electrical performance after aging, the leakage current measurements were repeated after 2000 hours of storage (temperature of 85° C. and applied voltage 35V). The results are set forth below in Table 1.

TABLE 1

|  | DCL [μA] | ESR [mOhm] | Cap [μF] | DCL after 2000 hours, 85° C./35 V [μA] |
|---|---|---|---|---|
| Example 1 | 125.00 | 148 | 22.3 | >1000 |
| Example 2 | 0.07 | 65 | 21.1 | <0.01 |
| Example 3 | 0.15 | 15 | 20.2 | <0.01 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A capacitor assembly comprising:
   a first solid electrolytic capacitor element and a second solid electrolytic capacitor element, wherein the capacitor elements contain an anode, a dielectric coating overlying the anode that is formed by anodic oxidation, and a conductive polymer overlying the dielectric layer, wherein the first capacitor element is spaced apart from the second capacitor element in a certain direction;
   an anode termination to which the first capacitor element and the second capacitor element are electrically connected;
   a cathode termination to which the first capacitor element and the second capacitor element are electrically connected; and
   a resinous material that substantially fills the space defined between the first capacitor element and the second capacitor element.

2. The capacitor assembly of claim 1, wherein the conductive polymer of the first capacitor element, the second capacitor element, or both contains a polypyrrole, polythiophene, polyaniline, polyacetylene, poly-p-phenylene, polyphenolate, or a combination thereof.

3. The capacitor assembly of claim 2, wherein the polythiophene is poly(3,4-ethylenedioxythiophene).

4. The capacitor assembly of claim 1, wherein the conductive polymer of the first capacitor element, the second capacitor element, or both is formed from a dispersion of pre-polymerized conductive polymer particles.

5. The capacitor assembly of claim 4, wherein the particles have an average diameter of from about 1 to about 500 nanometers.

6. The capacitor assembly of claim 4, wherein the dispersion contains a polymeric anion.

7. The capacitor assembly of claim 6, wherein the polymeric anion is polystyrene sulfonic acid.

8. The capacitor assembly of claim 1, wherein the breakdown voltage of the capacitor assembly is about 60 volts or more.

9. The capacitor assembly of claim 1, wherein the breakdown voltage of the capacitor assembly is about 100 volts or more.

10. The capacitor assembly of claim 1, wherein the resinous material includes an epoxy resin.

11. The capacitor assembly of claim 1, wherein the resinous material extends around the capacitor elements and forms a sheath for the capacitor assembly, wherein at least a portion of the anode termination and at least a portion of the cathode termination remain exposed by the sheath.

12. The capacitor assembly of claim 1, wherein a major surface of the first capacitor element and the second capacitor element are provided in a vertical configuration.

13. The capacitor assembly of claim 1, wherein the capacitor assembly defines a dimension in the direction in which the capacitor elements are spaced apart, and wherein the ratio of the space between the capacitor elements and the dimension of the capacitor assembly is from about 0.01 to about 0.1.

14. The capacitor assembly of claim 13, wherein the ratio is from about 0.01 to about 0.05.

15. The capacitor assembly of claim 1, wherein the capacitor elements are spaced apart a distance of from about 40 micrometers to about 100 micrometers.

16. The capacitor assembly of claim 1, wherein the first capacitor element comprises a first anode lead and the second capacitor element comprises a second anode lead, wherein the first anode lead and the second anode lead extend in a direction that is substantially perpendicular to the direction in which the capacitor elements are spaced apart.

17. The capacitor assembly of claim 16, wherein the first anode lead and the second anode lead are electrically connected to the anode termination.

18. The capacitor assembly of claim 1, wherein the anode includes tantalum, niobium, or an electrically conductive oxide thereof.

19. A method for forming a capacitor assembly, the method comprising:

providing a first solid electrolytic capacitor element and a second solid electrolytic capacitor element, wherein the capacitor elements contain an anode that includes tantalum, niobium, or an electrically conductive oxide thereof, a dielectric coating overlying the anode that is formed by anodic oxidation, and a conductive polymer overlying the dielectric layer, and wherein the first and second capacitor elements contain respective first and second anode leads extending from the anode;

providing a lead frame that defines a cathode termination and an anode termination;

positioning the first and second capacitor elements on the lead frame so that the first capacitor element is spaced apart from the second capacitor element in a certain direction;

electrically connecting the first capacitor element and the second capacitor element to the cathode termination;

electrically connecting the first anode lead and the second anode lead to the anode termination;

positioning the first and second capacitor elements, the anode termination, and the cathode termination within a case; and applying a resinous material to the case so that the material substantially fills the space between the first capacitor element and the second capacitor element.

20. The method of claim 19, further comprising curing the resinous material.

21. The method of claim 19, wherein the conductive polymer of the first capacitor element, the second capacitor element, or both contains a polypyrrole, polythiophene, polyaniline, polyacetylene, poly-p-phenylene, polyphenolate, or a combination thereof.

22. The method of claim 19, wherein the conductive polymer of the first capacitor element, the second capacitor element, or both is formed from a dispersion of pre-polymerized conductive polymer particles.

23. The method of claim 19, wherein the breakdown voltage of the capacitor assembly is about 60 volts or more.

24. The method of claim 19, wherein the capacitor assembly defines a dimension in the direction in which the capacitor elements are spaced apart, and wherein the ratio of the space between the capacitor elements and the dimension of the capacitor assembly is from about 0.01 to about 0.1.

25. The method of claim 19, wherein the ratio is from about 0.01 to about 0.05.

* * * * *